United States Patent
Yamai et al.

(10) Patent No.: US 7,279,139 B2
(45) Date of Patent: Oct. 9, 2007

(54) AGITATION TYPE POWDER DISSOLVING APPARATUS FOR REPROCESSING SPENT NUCLEAR FUEL

(75) Inventors: Hideki Yamai, Hitachi (JP); Masato Ooura, Hitachi (JP); Kazunari Uchida, Hitachi (JP); Tadahiro Washiya, Naka-gun (JP); Tomozo Koyama, Naka-gun (JP)

(73) Assignee: Japan Nuclear Cycle Development Institute, Ibaraki-ken (JP)

( * ) Notice: Subject to any disclaimer, the term of this patent is extended or adjusted under 35 U.S.C. 154(b) by 501 days.

(21) Appl. No.: 10/626,552

(22) Filed: Jul. 25, 2003

(65) Prior Publication Data

US 2004/0156758 A1 Aug. 12, 2004

(30) Foreign Application Priority Data

Aug. 2, 2002 (JP) ............................. 2002-225654

(51) Int. Cl.
B01J 19/18 (2006.01)
B01J 8/10 (2006.01)

(52) U.S. Cl. ...................... 422/159; 422/225; 422/228; 422/232

(58) Field of Classification Search ................ 422/159, 422/228

See application file for complete search history.

(56) References Cited

U.S. PATENT DOCUMENTS 2,696,506 A * 12/1954 Smith et al. ................. 568/456
2,767,847 A * 10/1956 Russell et al. ............... 210/513
4,528,130 A * 7/1985 Ledebrink et al. ........... 252/643

FOREIGN PATENT DOCUMENTS

| DE | 391010 | | 11/1922 |
| DE | 199 57 817 | | 6/2001 |
| EP | 0 472 459 | | 2/1992 |
| JP | 3-245829 | | 11/1991 |
| JP | 06296980 | A * | 10/1994 |
| JP | 07060093 | | 3/1995 |
| JP | 09052038 | | 2/1997 |
| JP | 2000262878 | | 9/2000 |
| JP | 2001198444 | A * | 7/2001 |
| JP | 2002058913 | A * | 2/2002 |

* cited by examiner

Primary Examiner—Glenn Caldarola
Assistant Examiner—Jennifer A. Leung
(74) Attorney, Agent, or Firm—Wenderoth, Lind & Ponack, L.L.P.

(57) ABSTRACT

An agitation type powder dissolving apparatus comprises a dissolving tank into which powder of spent nuclear fuel is to be supplied, an agitating member rotatably disposed in the dissolving tank, and rise inhibiting structure, disposed in the dissolving tank above the agitating member, for inhibiting the powder from swirling and rising due to rotation of the agitating member. The rise inhibiting structure is composed of a plurality of fixed blades for causing powder, which would otherwise swirl and rise due to rotation of the agitating member, to move downward. Each fixed blade has a descending slope with respect to a swirling direction during swirling and rising. This dissolving apparatus prevents non-dissolved particles from overflowing.

20 Claims, 3 Drawing Sheets

AGITATION TYPE POWDER DISSOLVING APPARATUS FOR REPROCESSING SPENT NUCLEAR FUEL

BACKGROUND OF THE INVENTION

The present invention relates to a dissolving apparatus for reprocessing spent nuclear fuel such as mixed oxide (MOX) fuel in a nuclear fuel cycle.

An example of a slurry (powder) agitation apparatus is disclosed in Japanese Patent Laid-Open No.07-060093/1995. As shown in FIG. 6, this agitation apparatus is designed to agitate powder 51 and liquid by an agitating device 52 (an agitating blade) in an agitating tank 50.

When performing dissolution processing of spent nuclear fuel in such an agitation apparatus as described above, non-dissolved particles of powder rise, due to agitation by the agitating device in a solution, to disadvantageously leak from a solution outlet disposed on an upper part of the agitating tank.

SUMMARY OF THE INVENTION

The present invention has been accomplished in view of the above-mentioned technical background, and it is an object of the present invention to provide an improvement that can prevent leakage of non-dissolved particles.

According to the present invention, there is provided an agitation type powder dissolving apparatus for reprocessing spent nuclear fuel, the apparatus comprising: a dissolving tank into which powder of spent nuclear fuel is to be supplied; an agitating member rotatably disposed in the dissolving tank; and rise inhibiting structure, disposed in the dissolving tank above the agitating member, for inhibiting powder from swirling and rising due to rotation of the agitating member.

In one embodiment of the present invention, the rise inhibiting structure is composed of a plurality of fixed blades for causing powder, which would otherwise swirl and rise due to rotation of the agitating member, to move downward. Preferably, each fixed blade has a descending slope with respect to a swirling direction during swirling and rising. A top board having a number of distribution apertures is preferably disposed above the fixed blades.

In another embodiment of the present invention, the rise inhibiting structure comprises a plurality of half-round shaped swirl and rise inhibiting plates which are arranged hierarchically, with each of the inhibiting plates having a dimension such that the inhibiting plates overlap one another in respective centers of frames thereof, and each inhibiting plate has a slope ascending outward.

In still another embodiment of the present invention, the rise inhibiting structure comprises a reversed-conical shaped swirl and rise inhibiting member with a distribution hole formed in a center thereof.

In another aspect of the present invention, there is provided an agitation type powder dissolving apparatus for reprocessing spent nuclear fuel, the apparatus comprising: a dissolving tank into which powder of spent nuclear fuel is to be supplied; an agitating member rotatably disposed in the dissolving tank; rise inhibiting structure, disposed in the dissolving tank above the agitating member, for inhibiting the powder from swirling and rising due to rotation of the agitating member; a powder supply system for supplying the powder of the spent nuclear fuel to a lower part of the dissolving tank; a nitric acid supply system for supplying nitric acid to the lower part of the dissolving tank; and a solution discharge system for discharging a solution including powder dissolved in nitric acid from an upper part of the dissolving tank.

DETAILED DESCRIPTION OF THE PREFERRED EMBODIMENTS

Some examples according to a preferred embodiment of the present invention will be described in detail hereinafter with reference to the accompanying drawings.

Figure 1:
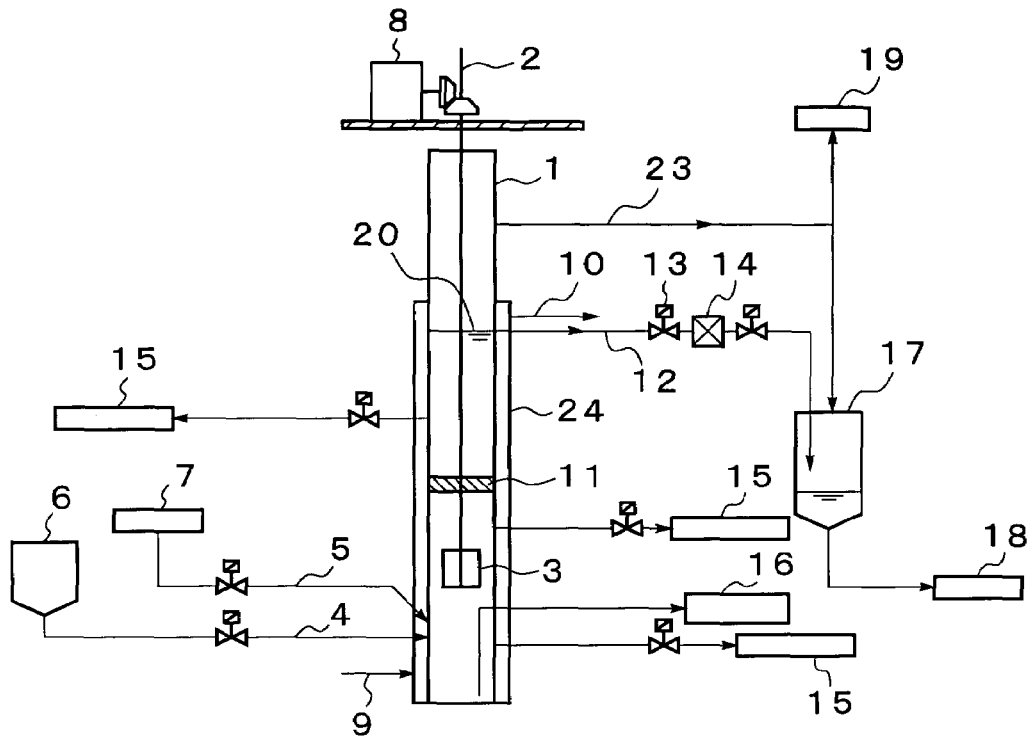
FIG. 1 is a longitudinal sectional view showing an example of an agitation type powder dissolving apparatus for reprocessing spent nuclear fuel according to a preferred embodiment of the present invention.
Figure 2A:
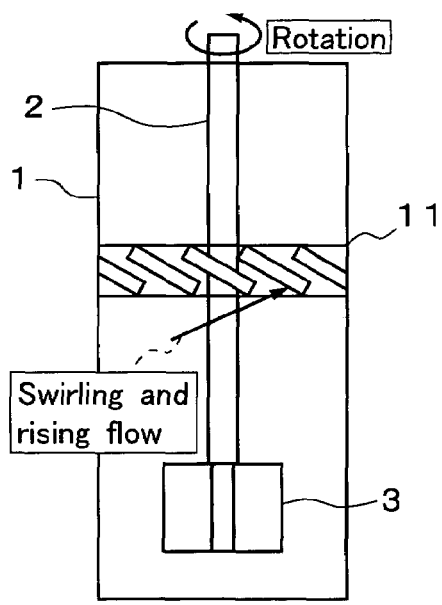
FIG. 2A is a longitudinal sectional view showing an example of a dissolving tank according to the preferred embodiment of the present invention.
Figure 2B:
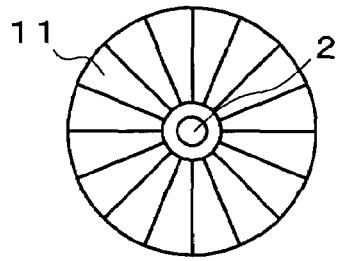
FIG. 2B is a horizontal sectional view showing the dissolving tank of FIG. 2A.

Now, an example as shown in FIG. 1, FIG. 2A and FIG. 2B will be described below.

FIG. 2A is a longitudinal sectional view of a dissolving tank, while FIG. 2B is a horizontal sectional view thereof.

Although various kinds of spent nuclear fuel are to be reprocessed, MOX (Mixed Oxide) fuel will be explained as an example of the fuel.

A dissolving tank 1 is a longitudinal cylindrical vessel. In the dissolving tank 1, an agitating member (plate-like vertical agitation paddle) 3 is rotatably arranged. The dissolving tank 1 has its outer peripheral surface covered with a steam jacket 24, into which steam for heating is supplied.

Above the dissolving tank 1 is arranged a motor 8, which transmits its rotation to a shaft 2 supporting the agitating member 3 via a gear.

In the dissolving tank 1 above the agitating member 3, there are provided fixed blades 11 for serving as rise inhibiting structure for inhibiting non-dissolved particles, described later, from swirling and rising in a solution. Each of the fixed blades 11 is fan-shaped. A number of fixed blades are arranged around the shaft 2 side by side.

Each fixed blade 11 is supported and fixed on the dissolving tank 1. An outer peripheral surface of each fixed blade 11 abuts against an inner surface of the dissolving tank 1, while an inner end of the blade is not in contact with an outer periphery of the shaft 2 to form a slight clearance therebetween. This clearance prevents the inner end of the fixed blade 11 from coming into contact with the outer periphery of the shaft 2 during rotation of the shaft 2.

Adjacent fixed blades 11 are arranged in such a manner that they overlap each other at end portions thereof, and that each blade has a descending slope with respect to a direction of rotation of the agitating member 3.

A powder tank 7 for storage of MOX fuel and the like is connected to a lower part of the dissolving tank 1 via a powder supply pipe 5. A powder supply system which has the powder tank 7 and the powder supply pipe 5 further includes a valve provided midway along the supply pipe 5, for thereby stopping supply to the dissolving tank 1.

A nitric acid tank 6 for storage of nitric acid is connected to the lower part of the dissolving tank 1 via a nitric acid supply pipe 4. A nitric acid supply system which has the nitric acid tank 6 and the nitric acid supply pipe 4 further includes a valve provided midway along the supply pipe 4, for thereby adjusting a supply amount of nitric acid to the dissolving tank 1 and/or stopping supply thereof.

A solution outlet is disposed on an upper part of the dissolving tank 1. A vertical position of the solution outlet may be above a position of the fixed blades 11, and equal to or lower than a top position of the dissolving tank 1. This solution outlet is connected to a solution storage tank 17 via a solution discharge pipe 12. The solution storage tank 17 is further connected to a solution adjusting tank 18. A solution discharge system from the solution outlet to the solution adjusting tank 18 further includes a filter 14 and an electromagnetic valve 13 provided midway along the solution discharge pipe 12.

The steam jacket 24 has a steam inlet 9 on its lower part and a steam outlet 10 on its upper part. Steam having a temperature of about 60° C. to 80° C. is supplied to the steam jacket 24 to warm the dissolving tank 1 from its outer periphery. The above-described solution outlet is arranged at a slightly lower position than that of the steam outlet 10, so that a fluid level of a solution 20 is flush with the solution outlet.

On the upper part of the dissolving tank 1 (which is located higher than the solution outlet) is provided an off gas outlet for discharging therefrom an off gas ($NO_x$) produced by a reaction between the MOX fuel and the nitric acid. The off gas outlet is connected to an off gas processing system 19 via an off gas discharge pipe 23. The off gas processing system 19 is further connected to the solution storage tank 17.

A dissolution reaction of powder of the MOX fuel is an exothermic reaction, thus leading to a possibility that bumping may occur. In order to recapture a solution included in the off gas ($NO_x$) due to this bumping, the off gas processing system 19 is connected to the solution storage tank 17.

A steam jet pump 16 is disposed for discharging liquid with its suction side connected to the bottom of the dissolving tank 1. The steam jet pump 16 for discharging liquid can discharge non-dissolved residue and the like accumulating in the bottom of the dissolving tank 1.

Three nitric acid concentration analyzers 15 are provided for measuring a concentration of nitric acid in the dissolving tank 1. In detail, a first concentration analyzer is arranged to measure concentration of nitric acid located in the bottom of the dissolving tank 1, a second analyzer is arranged to measure concentration of nitric acid in a middle (between the agitating member 3 and the fixed blades 11) of the dissolving tank, and a third analyzer is arranged to measure concentration of nitric acid in a top (above the fixed blades 11) of the dissolving tank. Thus, nitric acid concentrations in the bottom, the middle, and the top of the dissolving tank 1 are measured by the nitric acid concentration analyzers 15. The valves in the powder supply system and the nitric acid supply system are used to adjust a supply amount of the powder and nitric acid solution, thereby maintaining a good state of dissolution.

The MOX fuel and the nitric acid solution are supplied to the dissolving tank 1 from the powder tank 7 and the nitric acid tank 6, respectively, and stirred and rotated with the agitating member 3, so that dissolution of the MOX fuel proceeds. This dissolved solution overflows from the solution outlet disposed on the upper part of the dissolving tank 1 to flow to the solution storage tank 17 and/or the solution adjusting tank 18 via the solution discharge system.

In such dissolution processing, rotation of the agitating member 3 causes a swirling and rising flow above the agitating member 3. This flow has its outer periphery rising outward and swirling, with its center descending.

Non-dissolved fine particles (fine powder having a diameter of about 100 μm), which are being dissolved into a solution, ride on this swirling and rising flow to rise or ascend. Although relatively large particles would sink because of its weight, the fine particles are so light that they can ride on the swirling and rising flow.

The non-dissolved fine particles which rise riding on the swirling and rising flow come into collision with the sloped fixed blades 11 disposed above the agitating member 3 to change their flow direction to downward, resulting in little possibility that the non-dissolved particles rise across the fixed blades 11. This allows a highly concentrated solution to flow from the solution outlet, thereby preventing the non-dissolved particles from overflowing through the solution outlet.

Each fixed blade 11 has a descending slope with respect to the direction of rotation of the agitating member 3 (namely, a swirling direction of the swirling and rising flow). In addition, the fixed blades 11 are arranged in such a manner that they overlap one another at the end portions thereof This eliminates a clearance or gap between the fixed blades 11, thereby preventing the non-dissolved particles riding on the swirling upflow from escaping from a clearance between the fixed blades 11 upward, and thereby lessening overflow of the non-dissolved particles.

Accordingly, this provides an improvement in a speed of spent nuclear fuel reprocessing and in an ability to perform a nuclear fuel cycle process.

Now, another example will be described with reference to FIGS. 3A and 3B.

Figure 3A:
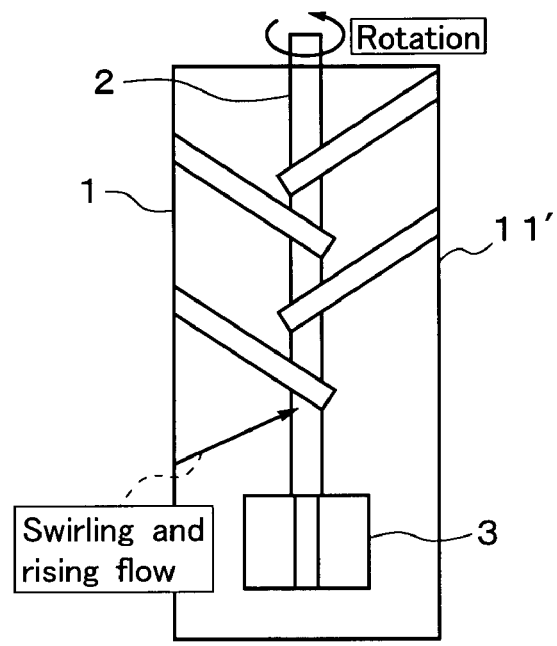
FIG. 3A is a longitudinal sectional view showing another example of a dissolving tank according to the preferred embodiment of the present invention.
Figure 3B:
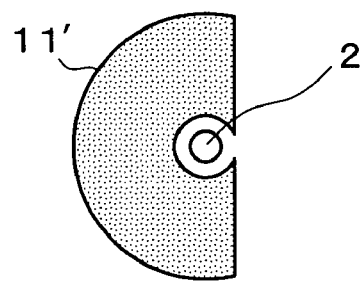
FIG. 3B is a horizontal sectional view showing the dissolving tank of FIG. 3A.

FIG. 3A shows a longitudinal sectional view of a dissolving tank, while FIG. 3B shows a horizontal sectional view thereof.

The following explanation about this example will show points different from FIGS. 2A and 2B. Elements in these figures that are in common with FIGS. 2A and 2b are given the same reference designators, and description thereof will be omitted.

Swirl and rise inhibiting plates 11', serving as rise inhibiting structure, each of which is half-round shaped, are arranged hierarchically such that they overlap one another in respective centers of frames thereof. Each swirl and rise inhibiting plate 11' is fixed with its outer peripheral surface abutting against an inner surface of dissolving tank 1. In a center of its frame, each swirl and rise inhibiting plate 11' has a hole into which shaft 2 is inserted. There is provided a clearance between the hole and the shaft 2 so that the shaft 2 is not brought into contact with an inner surface of the hole.

Each swirl and rise inhibiting plate 11' has a slope ascending outward. The rise inhibiting structure may be reversed-conical shaped.

A swirling and rising flow produced by rotation of agitating member 3 comes into collision with the swirl and rise inhibiting plates 11' to change its flow direction to downward. Thus, there is little possibility that non-dissolved particles flow from the solution outlet.

Now, still another example will be described with reference to FIGS. 4A and 4B.

Figure 4A:
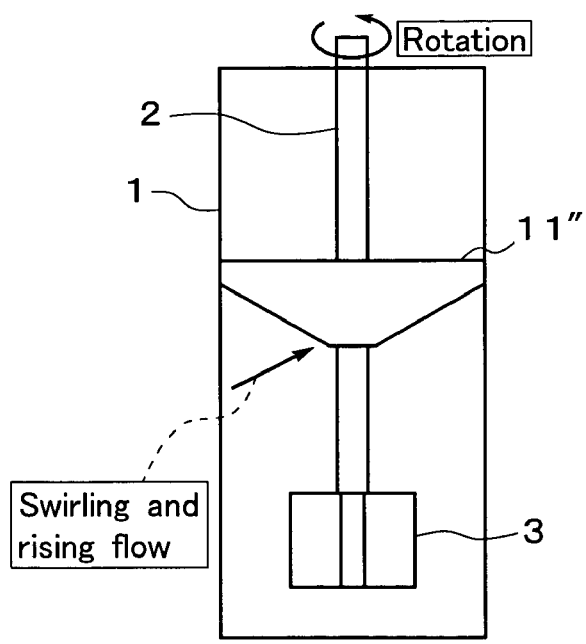
FIG. 4A is a longitudinal sectional view showing still another example of a dissolving tank according to the preferred embodiment of the present invention.
Figure 4B:
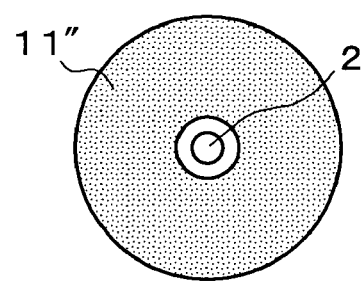
FIG. 4B is a horizontal sectional view showing the dissolving tank of FIG. 4A.

FIG. 4A shows a longitudinal sectional view of a dissolving tank, while FIG. 4B shows a horizontal sectional view thereof.

The following explanation about this example will show points different from FIGS. 2A and 2B. Elements in these figures that are in common with FIGS. 2A and 2B are given the same reference designators, and description thereof will be omitted.

A swirl and rise inhibiting vane 11" constituting rise inhibiting structure is reversed-conically shaped and formed of a board. This swirl and rise inhibiting vane 11" has a distribution hole formed in a center thereof, into which shaft 2 is inserted.

A swirling and rising flow produced by rotation of agitating member 3 comes into collision with the swirl and rise inhibiting vane 11" to change its flow direction to downward. There is little possibility that non-dissolved particles flow from the solution outlet. Then, a highly concentrated solution rises across the distribution hole to flow from the solution outlet.

Figure 5:
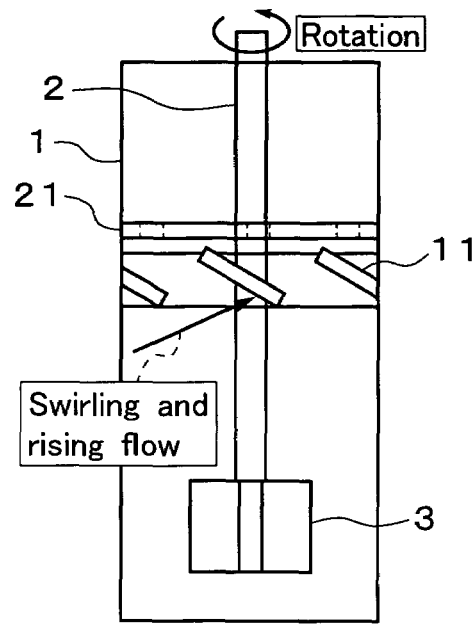
FIG. 5 is a longitudinal sectional view showing a further example of a dissolving tank according to the preferred embodiment of the present invention.
Figure 6:
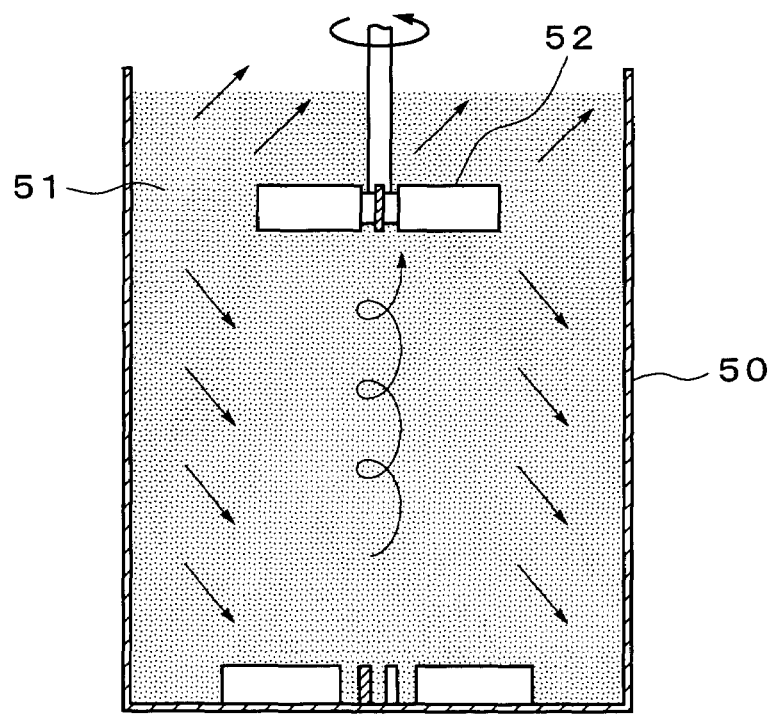
FIG. 6 shows an example of a prior art slurry agitation apparatus.

Finally, a further example will be described below with reference to FIG. 5 showing a longitudinal sectional view of a dissolving tank.

The following explanation about this example will show points different from FIGS. 2A and 2B. Elements in these figures that are in common with FIGS. 2A and 2B are given the same reference designators, and description thereof will be omitted.

A top board 21 having a number of distribution apertures is disposed above fixed blades 11, in which the example of FIG. 5 differs from that of FIGS. 2A and 2B.

The top board 21 disposed above the fixed blades 11 more effectively prevents non-dissolved particles from rising in a solution. Thus, there is less possibility of non-dissolved particles flowing out of the solution outlet.

An appropriate selection of positions of the distribution apertures in the top board 21 with respect to positions of the fixed blades 11 can lessen overflow of the non-dissolved particles.

As can be seen from the foregoing, the present invention effectively prevents non-dissolved particles from overflowing, thereby providing improvement in a speed with which spent nuclear fuel is reprocessed and in an ability to perform a nuclear fuel cycle process.

What is claimed is:

1. An apparatus for reprocessing spent nuclear fuel, comprising:
   a dissolving tank having a first inlet and a second inlet in a lower part thereof;
   a powder supply system, in communication with said first inlet, for continuously supplying powder of spent nuclear fuel through said first inlet and into a lower portion of said dissolving tank;
   an agitating member rotatably disposed in said dissolving tank;
   a nitric acid supply system, including a supply of nitric acid in communication with said second inlet, for supplying nitric acid through said second inlet and into said lower portion of said dissolving tank; and
   rise inhibiting structure, disposed in said dissolving tank above said agitating member, for inhibiting non-dissolved powder of the spent nuclear fuel from rising while allowing a solution, including powder of the spent nuclear fuel that has been dissolved by the nitric acid supplied into said lower portion of said dissolving tank, to flow upwardly past said rise inhibiting structure,
   wherein said first inlet and said second inlet are each at a level beneath a level at which said agitating member is located.

2. The apparatus according to claim 1, further comprising:
   a solution discharge system for discharging the solution from an upper part of said dissolving tank after the solution has flowed past said rise inhibiting structure.

3. The apparatus according to claim 2, further comprising:
   a steam jacket, surrounding an outer peripheral surface of said dissolving tank, for allowing steam to be supplied between said steam jacket and said outer peripheral surface of said dissolving tank so as to heat said dissolving tank.

4. The apparatus according to claim 3, wherein
   said rise inhibiting structure comprises fixed blades for causing the non-dissolved powder, which would otherwise swirl and rise past said fixed blades due to rotation of said agitating member, to move downward.

5. The apparatus according to claim 4, wherein
   each of said fixed blades has a descending slope with respect to a swirling direction of the non-dissolved powder during swirling and rising of the non-dissolved powder to said fixed blades.

6. The apparatus according to claim 5, further comprising:
   a top board, having a number of distribution apertures, above said fixed blades.

7. The apparatus according to claim 3, wherein
   said rise inhibiting structure comprises half-round shaped swirl and rise inhibiting plates arranged one above another and overlapping one another in an axial direction of said dissolving tank, with each of said rise inhibiting plates having a slope ascending outwardly.

8. The apparatus according to claim 3, wherein
   said rise inhibiting structure comprises a reversed-conical shaped swirl and rise inhibiting vane having a central distribution hole.

9. The apparatus according to claim 3, further comprising:
   a shaft supporting said agitating member,
   wherein said rise inhibiting structure has
   (i) an outer peripheral surface abutting an inner surface of said dissolving tank, and
   (ii) a central hole through which said shaft extends with a slight clearance,
   such that the solution is to flow past said rise inhibiting structure by flowing through said slight clearance.

10. The apparatus according to claim 1, further comprising:
    a shaft supporting said agitating member,
    wherein said rise inhibiting structure has
    (i) an outer peripheral surface abutting an inner surface of said dissolving tank, and
    (ii) a central hole through which said shaft extends with a slight clearance,
    such that the solution is to flow past said rise inhibiting structure by flowing through said slight clearance.

11. An apparatus for reprocessing spent nuclear fuel, comprising:
    a dissolving tank having a first inlet and a second inlet in a lower part thereof;

a powder supply system, in communication with said first inlet, for continuously supplying powder of spent nuclear fuel through said first inlet and into a lower portion of said dissolving tank;

an agitating member rotatably disposed in said dissolving tank;

a nitric acid supply system, including a supply of nitric acid in communication with said second inlet, for supplying nitric acid through said second inlet and into said lower portion of said dissolving tank; and means for inhibiting non-dissolved powder of the spent nuclear fuel from rising while allowing a solution, including powder of the spent nuclear fuel that has been dissolved by the nitric acid supplied into said lower portion of said dissolving tank, to flow upwardly past said means, wherein said first inlet and said second inlet are each at a level beneath a level at which said agitating member is located.

12. The apparatus according to claim 11, further comprising:

a solution discharge system for discharging the solution from an upper part of said dissolving tank after the solution has flowed past said means.

13. The apparatus according to claim 12, further comprising:

a steam jacket, surrounding an outer peripheral surface of said dissolving tank, for allowing steam to be supplied between said steam jacket and said outer peripheral surface of said dissolving tank so as to heat said dissolving tank.

14. The apparatus according to claim 13, wherein said means for inhibiting non-dissolved powder of the spent nuclear fuel from rising while allowing the solution including dissolved powder of the spent nuclear fuel to flow upwardly past said means comprises fixed blades for causing the non-dissolved powder, which would otherwise swirl and rise past said fixed blades due to rotation of said agitating member, to move downward.

15. The apparatus according to claim 14, wherein each of said fixed blades has a descending slope with respect to a swirling direction of the non-dissolved powder during swirling and rising of the non-dissolved powder to said fixed blades.

16. The apparatus according to claim 15, further comprising:

a top board, having a number of distribution apertures, above said fixed blades.

17. The apparatus according to claim 13, wherein said means for inhibiting non-dissolved powder of the spent nuclear fuel from rising while allowing the solution including dissolved powder of the spent nuclear fuel to flow upwardly past said means comprises half-round shaped swirl and rise inhibiting plates arranged one above another and overlapping one another in an axial direction of said dissolving tank, with each of said rise inhibiting plates having a slope ascending outwardly.

18. The apparatus according to claim 13, wherein said means for inhibiting non-dissolved powder of the spent nuclear fuel from rising while allowing the solution including dissolved powder of the spent nuclear fuel to flow upwardly past said means comprises a reversed-conical shaped swirl and rise inhibiting vane having a central distribution hole.

19. The apparatus according to claim 13, further comprising:

a shaft supporting said agitating member, wherein said means for inhibiting non-dissolved powder of the spent nuclear fuel from rising while allowing the solution including dissolved powder of the spent nuclear fuel to flow upwardly past said means has
(i) an outer peripheral surface abutting an inner surface of said dissolving tank, and
(ii) a central hole through which said shaft extends with a slight clearance, such that the solution is to flow past said means by flowing through said slight clearance.

20. The apparatus according to claim 11, further comprising:

a shaft supporting said agitating member, wherein said means for inhibiting non-dissolved powder of the spent nuclear fuel from rising while allowing the solution including dissolved powder of the spent nuclear fuel to flow upwardly past said means has
(i) an outer peripheral surface abutting an inner surface of said dissolving tank, and
(ii) a central hole through which said shaft extends with a slight clearance, such that the solution is to flow past said means by flowing through said slight clearance.

* * * * *